Patented Feb. 5, 1924.

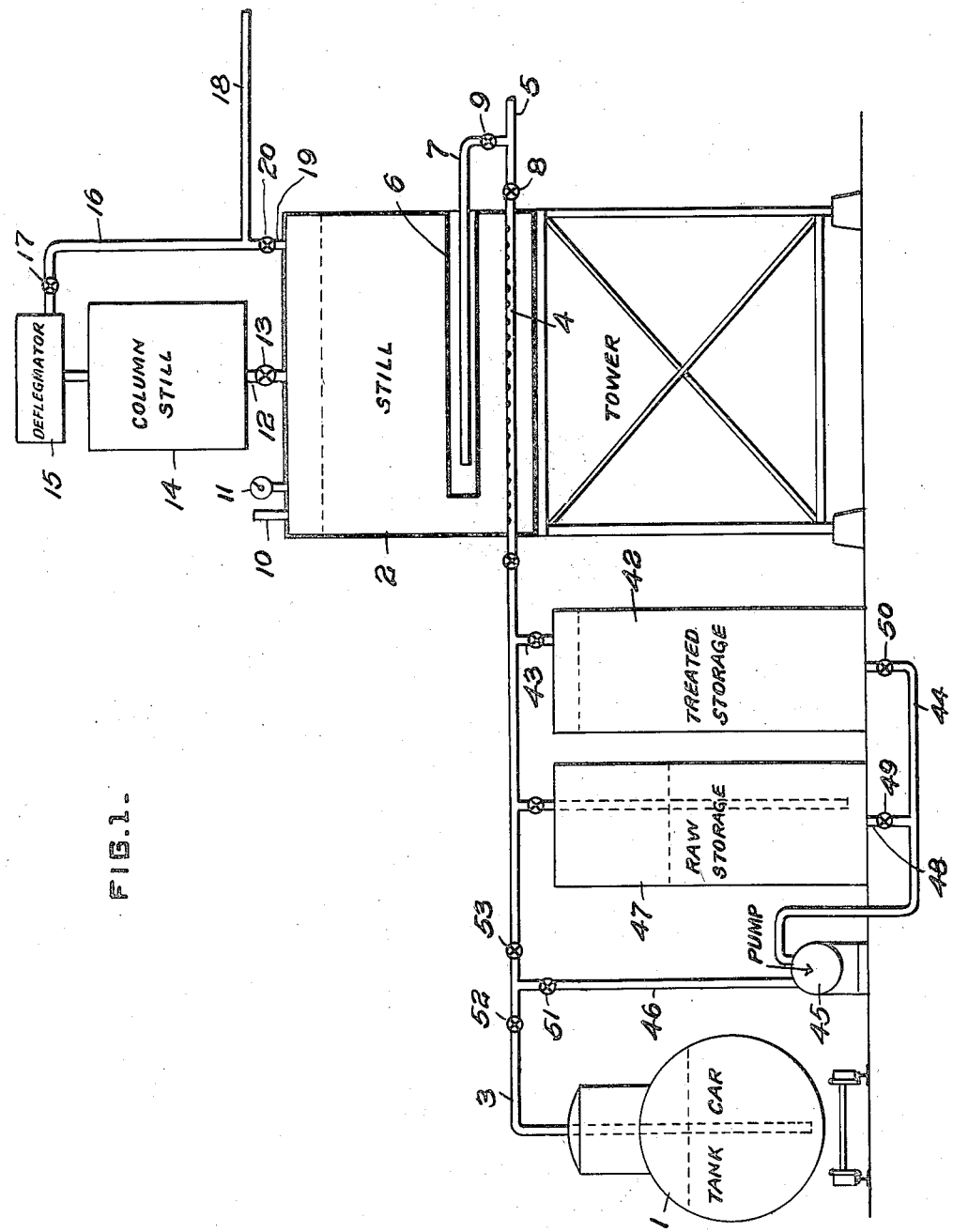

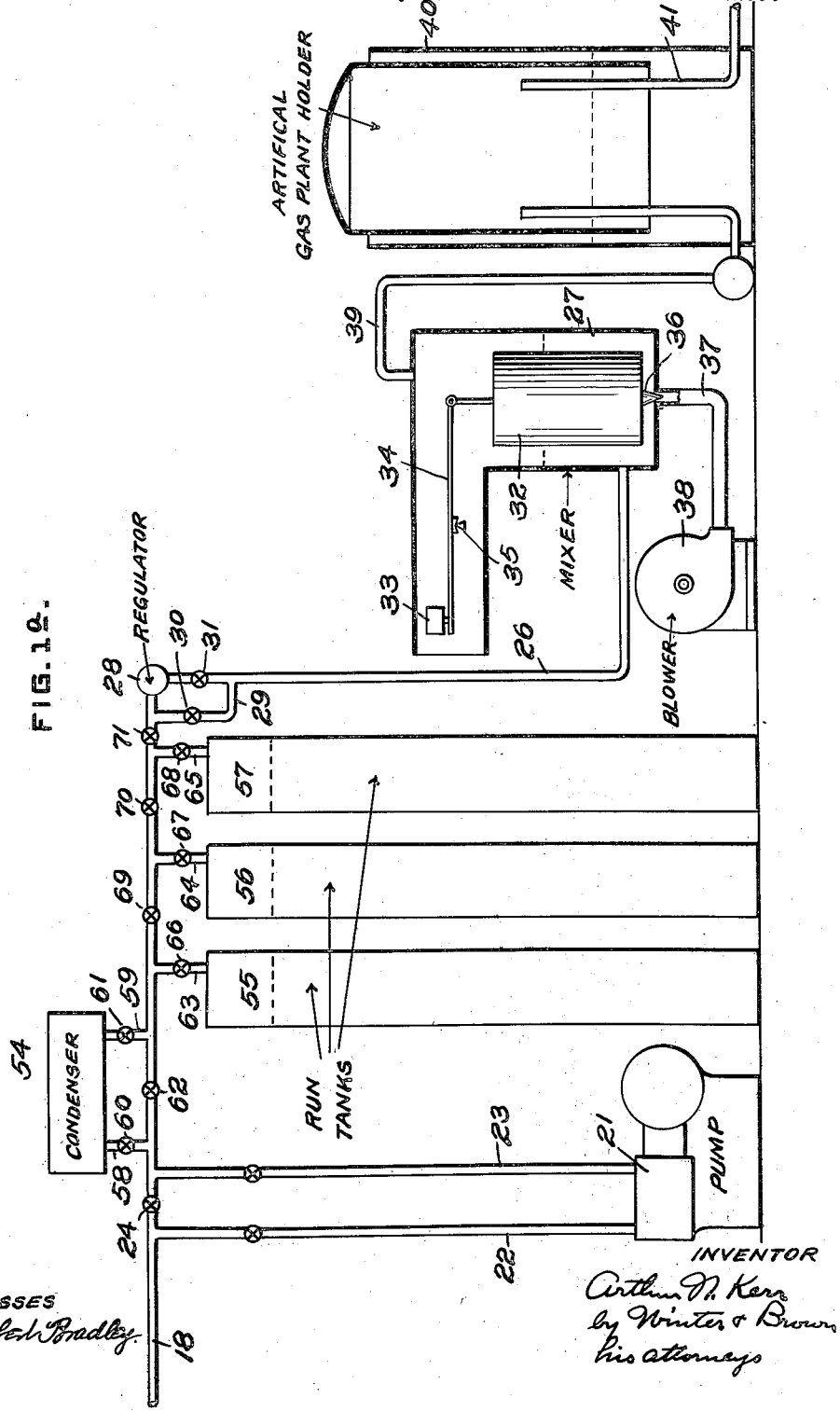

1,482,933

UNITED STATES PATENT OFFICE.

ARTHUR N. KERR, OF BELLEVUE, PENNSYLVANIA.

METHOD OF TREATING NATURAL-GAS GASOLINE AND OF MAKING GAS THEREFROM.

Application filed May 9, 1921. Serial No. 467,926.

*To all whom it may concern:*

Be it known that I, ARTHUR N. KERR, a citizen of the United States, and a resident of Ben Avon Heights, Bellevue, in the county of Allegheny and State of Pennsylvania, have invented a new and useful Improvement in Methods of Treating Natural-Gas Gasoline and of Making Gas Therefrom, of which the following is a specification.

The object of the invention is to provide a commercially practical method for converting the whole of natural gas gasoline into marketable products.

Natural gas gasoline, as the expression is used herein, is gasoline recovered from natural gas by the compression and cooling, absorption, and other processes which are used or have been suggested for the purpose. In the compression and cooling process, natural gas containing gasoline is compressed and cooled sufficiently to cause a large part of the gasoline content of the gas to condense. However, the gasoline thus recovered from the gas contains large percentages of combustible constituents of the gas which are lighter than the gasoline constituents. They are chiefly ethane, propane and butane, each of which is a gas under normal atmospheric temperature and pressure conditions.

In actual practice, a large portion of the lighter combustible constituents have been removed from the gasoline by weathering, that is to say, by exposing the gasoline at normal temperature to atmospheric pressure and permitting the lighter combustible constituents to vaporize and escape from the gasoline. The constituents thus removed are a total loss to the operator. However, even after removing the lighter combustible constituents by weathering, the remaining gasoline, which has a vapor tension sufficiently low to permit it to be transported, still contains sufficient of the lighter constituents to render it unsuitable for use as motor fuel. It has been used rather extensively for blending with heavier gasoline, but the resulting blend is objectionable largely because the lighter constituents volatilize too readily in the present day heated carburetors of internal combustion engines.

In the absorption method of recovering gasoline from natural gas, the natural gas is brought into contact with a suitable menstruum such as petroleum of about 40° Baumé gravity, in which the gasoline is absorbed. Subsequently, the menstruum is distilled for the removal of the gasoline in vapor form and the vapors are condensed. In this process also, an appreciable amount of the lighter combustible constituents of the gas are absorbed by the menstruum, distilled from it, and finally condensed. Because of this, absorption gasoline is also objectionable for the reasons stated with respect to gasoline recovered by the compression and cooling process.

Large quantities of natural gas gasoline are now being produced. It has been estimated that for every barrel of oil produced in this country, there is about one gallon of gasoline recovered from natural gas. The value of this gasoline, even at the present low price obtainable for it, is about $30,000,000 annually at the present rate of production in from six to seven hundred plants in the gas and oil fields of this country. Of the natural gas gasoline produced, about 20 to 50% consists of lighter combustible constituents, large portions of which are wasted, and as explained above, the remaining portions of which militate against the usefulness of the gasoline for motor fuel.

According to the present invention, the method of converting the whole of natural gas gasoline into marketable products and thereby eliminating the large waste of valuable natural resources, comprises distilling the lighter combustible constituents from the gasoline and mixing the vapor distillate with a gaseous carrier so that a combustible gas is formed having a high heating value and of a form which may readily and with entire safety be caused to flow through gas lines to various points of consumption. The distillation is carried on to such an extent that the residue may be used directly for motor fuel or other useful purposes without the prejudicial consequences arising from the presence of lighter combustible constituents in the present day weathered natural gas gasoline.

The distillation of the natural gas gasoline may be effected intermittently or continuously by heating the gasoline either directly by means of passing steam into it, or indirectly by heating the vessel containing it. However, the distillation is preferably effected by maintaining the gasoline at a suitable temperature and subjecting it to reduced pressure. By such preferred manner of distillation less of the heavier constituents of the natural gas gasoline are carried over by the lighter combustible constituents. Any other known or desired way of distilling the lighter constituents from the natural gas gasoline may be used, it being understood that by distillation is meant maintaining the natural gas gasoline at a proper relative temperature and pressure to effect the removal of the lighter combustible constituents from it. The distillation is preferably continued until the residue has an initial boiling point above about 60° F. under atmospheric pressure, and a vapor tension of less than about 10 pounds at 100° F. Also, it is preferred to continue the distillation until the gravity of the residue is not more than about 80° Baumé. The residue so characterized may be used directly without prejudicial effects arising from the pressure of lighter combustible constituents.

In vapor form, the lighter combustible constituents are mixed with a gaseous carrier in such proportions that the carrier will, under the conditions of service, prevent condensation of such constituents. The gaseous carrier may be artificial gas but is preferably air. When mixing the vapor with air the vapor may be above about 8% of the mixture. This will vary according to the requirements or conditions of service, as well as according to the character of the lighter combustible constituents, that is to say, whether they contain relatively large or small proportions of the heavier constituents.

The residue may be used directly, or the heating of the gasoline may be continued to effect a fractional distillation of the residue, the fractions being determined and controlled in any desired manner.

The invention may be practiced by means of an arrangement of apparatus diagrammatically represented in the accompanying drawings, of which Fig. 1 shows the left and Fig. 1ª the right hand portion of the apparatus. However, it will be understood that the apparatus shown is merely illustrative of one arrangement of numerous forms of apparatus which may be used.

The natural gas gasoline may be transported from the oil or gas fields in suitable containers or insulated tank cars 1 and may be conducted from such cars to a still 2 through a pipe 3. If, as is preferred, the distillation be effected by maintaining a vacuum over the gasoline, the air pump for this purpose may be used for withdrawing the gasoline from the tank cars. The gasoline may be maintained at a proper distillation temperature by either direct or indirect heating. For direct heating a perforate pipe 4 is arranged within still 2 and connected to a steam line 5. For indirect heating the still may be provided with a flue 6 adapted to be heated by a steam pipe 7 also connected to the steam line, the pipes 4 and 7 being provided, respectively, with valves 8 and 9 for controlling flow through them. To indicate its interior temperature and pressure, the still may be provided with a thermometer 10 and a pressure gage 11.

Arranged above the still and connected to it by a conduit 12 controlled by valve 13, there is a stone tower or column still 14, and above this a deflegmator 15. The distillate vapors finally emerging from the deflegmator flow through a pipe 16 provided with a valve 17 to a pipe 18, which is also connected by a branch pipe 19 to the still, the pipe 19 being provided with a control valve 20 so that the distillate may be carried either directly to pipe 18 or indirectly through the stone tower. A partial vacuum is maintained in, and the vapors are withdrawn from, the still by means of a combined vacuum pump and compressor 21 having its intake and discharge opening connected to pipe 18 by means of pipes 22 and 23 leading one from each side of a valve 24 in pipe 18.

The lighter combustible constituents removed from the natural gas gasoline in the manner and by the apparatus just explained are mixed with a proper amount of carrying gas, preferably air, to prevent them from condensing, and this mixture is used directly or stored under suitable pressure in a gas holder. For the latter purpose, the vapors are conducted through an extension of pipe 18 and a pipe 26 to an automatic mixer 27. If desired, a pressure regulator 28 may be placed in the line of connection between pump 21 and mixer 27, which regulator may be by-passed through a pipe 29 provided with a valve 30. When the pressure regulator is by-passed, flow through it may be shut off by means of a valve 31 arranged in pipe 26 adjacent to the regulator.

The automatic mixer diagrammatically shown herein comprises a float 32 counterbalanced by a weight 33 mounted for adjustment upon an arm 34 pivoted at 35 and connected to the float. The lower end of the float is provided with a valve 36 adapted to control the flow of air through a pipe 37 leading from an air pump or blower 38. The vapors of the lighter combustible constituents of the gasoline being considerably heavier than air or such other gaseous carrier as may be used, the float will rise and permit air to enter the mixer 27 in proportion to the vapors in the mixer. This action of the float may be controlled and varied by proper adjustment of the counter-weight 33 in a manner well understood.

From the mixer, the gas flows through a pipe 39 to a gas holder 40 in which it is maintained under proper pressure. This gas may be conducted through a pipe 41 to a service line or system of service lines for use in any of the usual ways in which artificial and natural gases are used.

The distillation of the natural gas gasoline for the removal of the lighter combustible constituents from it, is carried on until substantially all of such constituents have gone over. These constituents are chiefly ethane, propane, and butane, although small amounts of methane are frequently present in the gasoline. Under commercial operating conditions, it is not practicable to attempt to make a fine cut in this distillation, and hence, in removing substantially all of the lighter combustible constituents, there is necessarily some pentane and possible small amounts of even heavier hydrocarbons carried over with the lighter combustible constituents. However, the mixture of these vapors with a lighter gas as a carrier prevents all of them from condensing in the gas holder or service lines leading from it. While the distillation of natural gas gasoline from different fields is carried on to different extents, in substantially all cases it is desirable to continue the distillation until the residue is not more than 80° Baumé.

The apparatus shown herein includes means for variously treating the residue. If it is desired to use the entire residue it may be conducted into a treated storage reservoir 42 through a branch pipe 43 leading from pipe 3. From the reservoir 42 gasoline may be subsequently pumped into tank cars or other containers for transportation or distribution. For this purpose reservoir 42 is connected to a pipe 44 leading to a pump 45, the discharge opening of which is connected by a pipe 46 to pipe 3. Pump 45 may also be used to remove natural gas gasoline from a raw storage reservoir 47 to the still, such reservoir being connected to pipe 44 by a branch pipe 48 controlled by a valve 49. To properly control the flow through pipes connected to pump 45, pipe 44 is provided with a valve 50, pipe 46 with valve 51 and pipe 3 with valves 52 and 53.

If it is desired to fractionally distill the residue, its temperature may be raised, and, by means of pump 21 acting also as a compressor, the vapors may be passed into a condenser 54 from which the condensate may flow into run tanks 55, 56 or 57, each tank being for a different cut. After the distillation of the residue has continued for some time the vapors will readily condense without passing them through the condenser. Condenser 54 is connected to pipe 18 by means of branch pipes 58 and 59 controlled by valves 60 and 61, and between the points of connection of these pipes to pipe 18 such pipe may be provided with a control valve 62. The several run tanks 55, 56 and 57 are connected to pipe 18 by branch pipes 63, 64 and 65 controlled, respectively, by valves 66, 67 and 68, and beyond the points of connection of these branch pipes with pipe 18, pipe 18 is provided with control valves 69, 70 and 71. When desired, the condenser may be used for liquefying the lighter combustible constituents so that they may be stored for future use.

In the operation of the apparatus still 2 is first supplied with natural gas gasoline, this being conducted to the still from the tank cars 1 through pipe 3, all the valves in this pipe being open to permit flow into perforate pipe 4 from which gasoline is discharged into the still. The temperature of the gasoline and the degree of vacuum above it are then controlled in such manner that substantially all the lighter combustible constituents are distilled from the gasoline. These constituents in vapor form are conducted through pipe 18 to mixer 27 in which they are mixed in proper relative proportions with a gaseous carrier such as air. This mixture then flows through pipe 39 to gas holder 40. The residue may be discharged either as a whole into the storage reservoir 42 or it may be fractionally distilled and the fractional condensates run into run tanks 55, 56 and 57, depending upon their values. More or less run tanks may be provided as desired.

In the practice of the invention, the whole of the natural gas gasoline is converted into products which are marketable and thus there is eliminated the present loss of the lighter combustible constituents which in the trade are known as "tops." The tops are converted into an artificial gas, or utilized to enrich an artificial gas, and the remainder of the gasoline not only has its tops removed but the lighter combustible constituents are withdrawn to such an extent that the gasoline may be used without the prejudicial consequences incident to the presence of lighter combustible constituents in the gasoline. The natural gas gasoline may be shipped to localities where coal for producing artificial gas is expensive and where natural gas is not obtainable, and by the method disclosed herein, the locality may be supplied with artificial gas at a price considerably less than that for which coal gas could be supplied. Thus, a large waste of natural resources is eliminated with a saving to the country, and its elimination results in direct economies for the users of the artificial gas made according to the invention.

I claim:

1. The method of converting the whole of natural gas gasoline into marketable products, which comprises distilling the lighter combustible constituents from said gasoline, and without intermediate condensation mixing the vapor distillate with a gaseous carrier to form a transportable artificial gas.

2. The method of converting the whole of natural gas gasoline into marketable products, which comprises distilling the lighter combustible constituents from said gasoline, and without intermediate condensation mixing the vapor distillate with air to form a transportable artificial gas.

3. The method of converting the whole of natural gas gasoline into marketable products, which comprises distilling the lighter combustible constituents from the gasoline until the residue has a gravity of about 80° Baumé and an initial boiling point above about 60° F. at atmospheric pressure and a vapor tension less than about ten pounds per square inch at 100° F., and without intermediate condensation mixing the vapor distillate with air to form a transportable artificial gas.

In testimony whereof, I have hereunto set my hand.

ARTHUR N. KERR.

Witness:
EDWIN O. JOHNS.